M. E., W. W., H. L. & A. F. BUHSE.
CANDY WRAPPING MACHINE.
APPLICATION FILED JUNE 20, 1908.

929,075.

Patented July 27, 1909.
7 SHEETS—SHEET 1.

Fig. 1.

Witnesses:
W. H. Souba
Harry Opsahl.

Inventors:
M. E. Buhse.
W. W. Buhse.
H. L. Buhse.
A. F. Buhse.
By their Attorneys
Williamson and Merchant

M. E., W. W., H. L. & A. F. BUHSE.
CANDY WRAPPING MACHINE.
APPLICATION FILED JUNE 20, 1908.

929,075.

Patented July 27, 1909.
7 SHEETS—SHEET 5.

Witnesses:
W. H. Souba.
Harry Opsahl.

Inventors:
M. E. Buhse.
W. W. Buhse.
H. L. Buhse.
A. F. Buhse.
By their Attorneys:
William Merchant

M. E., W. W., H. L. & A. F. BUHSE.
CANDY WRAPPING MACHINE.
APPLICATION FILED JUNE 20, 1908.

929,075.

Patented July 27, 1909.
7 SHEETS—SHEET 7.

Witnesses:
W. H. Souba
Harry Opsahl

Inventors:
M. E. Buhse.
W. W. Buhse.
H. L. Buhse.
A. F. Buhse.
By their Attorneys:
Williamson Merchant

UNITED STATES PATENT OFFICE.

MAXIMILIAN E. BUHSE, WALTER W. BUHSE, HENRY L. BUHSE, AND ALEXANDER F. BUHSE, OF MINNEAPOLIS, MINNESOTA.

CANDY-WRAPPING MACHINE.

No. 929,075.  Specification of Letters Patent.  Patented July 27, 1909.

Application filed June 20, 1908. Serial No. 439,664.

*To all whom it may concern:*

Be it known that we, MAXIMILIAN E. BUHSE, WALTER W. BUHSE, HENRY L. BUHSE, and ALEXANDER F. BUHSE, citizens of the United States, residing at Minneapolis, in the county of Hennepin and State of Minnesota, have invented certain new and useful Improvements in Candy-Wrapping Machines; and we do hereby declare the following to be a full, clear, and exact description of the invention, such as will enable others skilled in the art to which it appertains to make and use the same.

Our invention relates particularly to candy wrapping machines, and is in the nature of an improvement on the machine set forth and broadly claimed in our prior patent No. 848,344, issued of date March 26, 1907.

The invention consists of the novel devices and combinations of devices hereinafter described and defined in the claims.

In the accompanying drawings which illustrate the invention, like characters indicate like parts throughout the several views.

Referring to the drawings.

In the present invention, as in the prior patent above identified, a non-rotary table 1 is supported by a framework 2, (preferably of cast metal construction) and a rotary feed table 3 is positioned immediately over and is concentrically pivoted to the table 1, as indicated at 4. Preferably both tables 1 and 3 are of thin sheet metal construction and are of disk-like form. The rotary feed table 3, at its periphery, is formed with a plurality of parcel receptacles or perforations 5, and on its under side it carries an annular spur gear 6. The fixed table 1 is provided with a plurality of small anti-friction wheels 7, upon which the outer portion of the rotary feed table 3 is mounted to run. At one point the non-rotary table 1 is cut away at 8 to afford a parcel delivery passage through which a parcel, made up of a piece of candy and its wrapper, may be forced downward from the vertically alined pocket 5 of the feed table 3, all as will be hereinafter more fully described.

Figure 3:
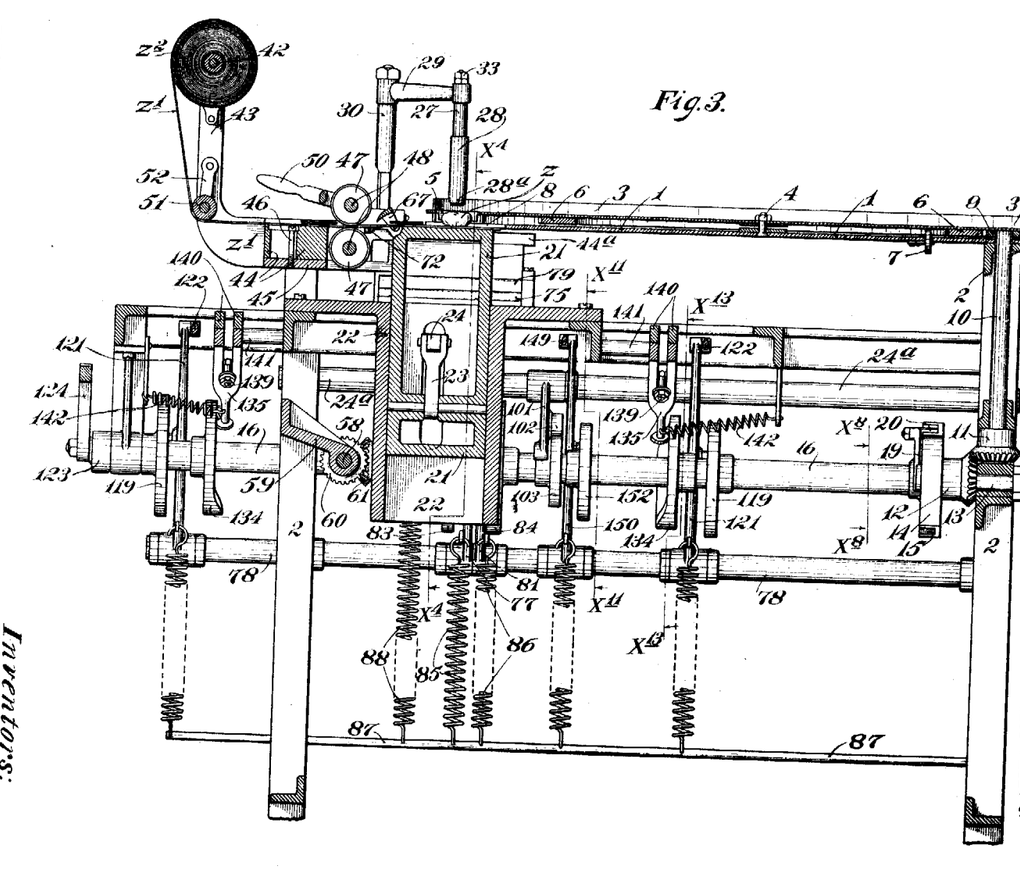
Fig. 3 is a vertical section taken through the machine on the line $x^3 x^3$ of Fig. 1, some parts being broken away.

The annular gear 6, which is carried by the rotary feed table 3, meshes with a spur pinion 9 secured to the upper end of a short vertical shaft 10 mounted in suitable bearings on the frame 2 and provided, at its lower end, with a miter gear 11 that meshes with a companion miter gear 12, shown as journaled on a stud 13 supported by the frame 2, as best shown in Fig. 3. To the hub of the gear 12 is secured a star wheel 14 having radial grooves 15.

Figure 1:
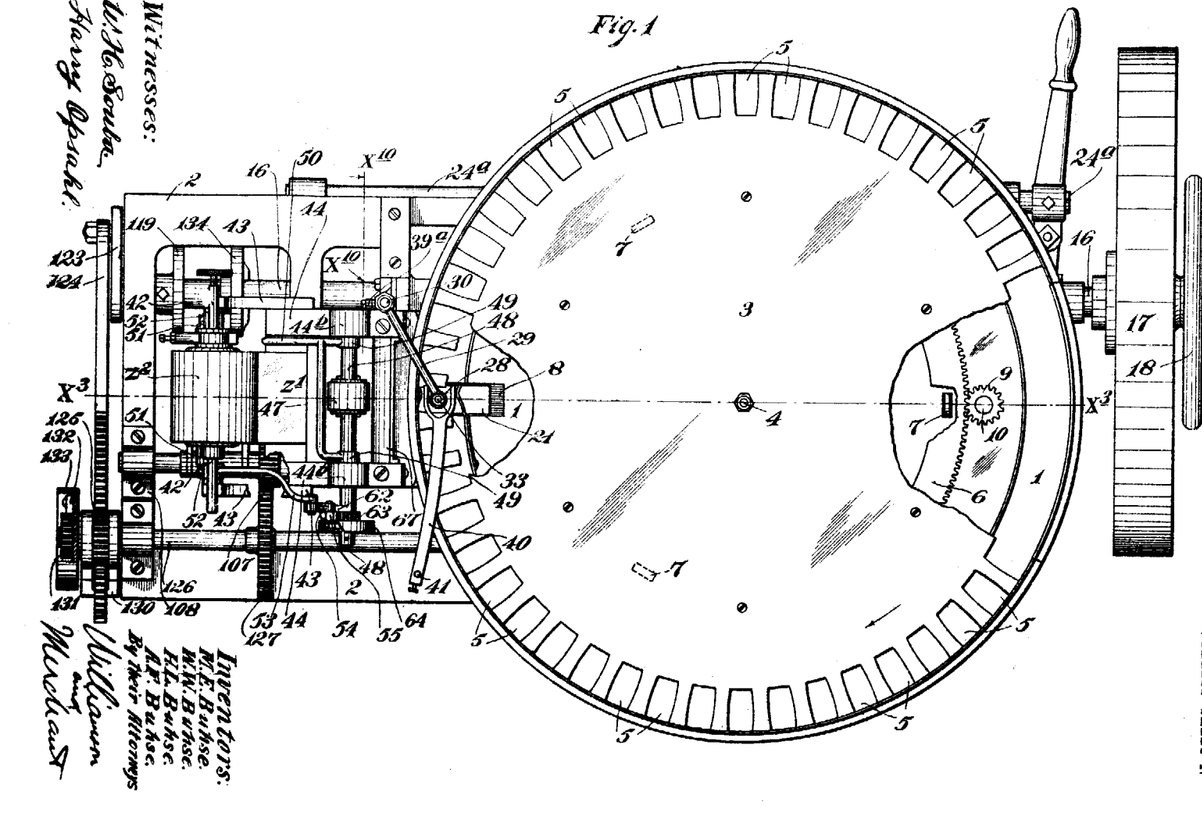
Figure 1 is a plan view of the machine, with some parts broken away.

All of the running parts of the machine receive motion through a long transversely extended countershaft 16 mounted in suitable bearings on the frame 2 and provided, at one end, with a pulley 17, by means of which it may be driven from a belt (not shown). As shown in Fig. 1, the shaft 16 is also provided with a hand wheel 18, by means of which it may be rotated for the purpose of testing or setting the machine, but this wheel is of little importance.

Figures 8, 9:
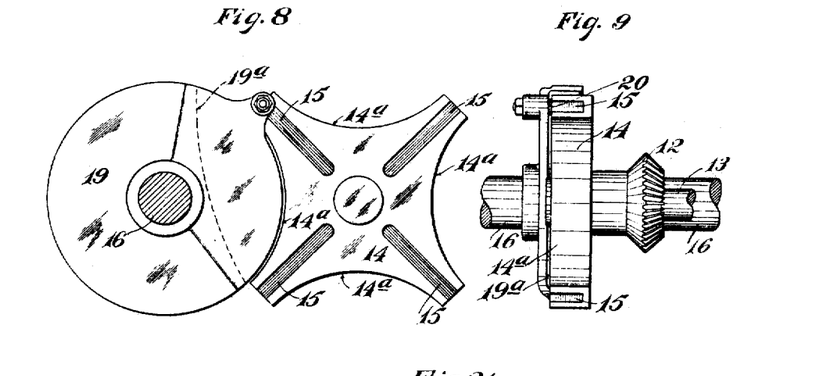
Fig. 8 is a detail in section on the line $x^8 x^8$ of Fig. 3.
Fig. 9 is a front elevation of the parts shown in Fig. 8.
Figure 10:
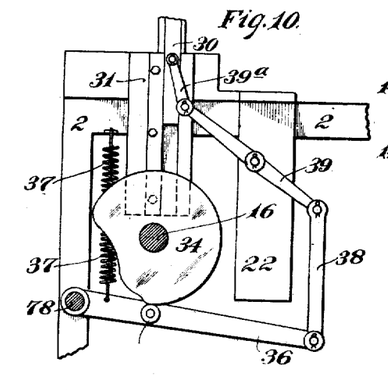
Fig. 10 is a fragmentary view, partly in elevation and partly in vertical section on the line $x^{10} x^{10}$ of Fig. 1, showing the cams and connections for operating the so-called parcel depressing plunger.
Figure 11:
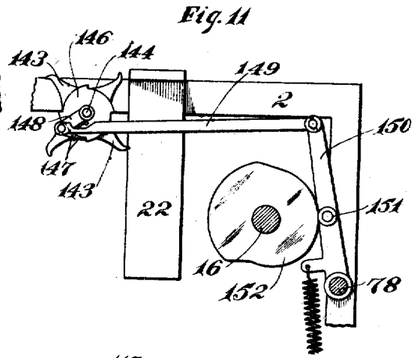
Fig. 11 is a fragmentary detail taken in section approximately on the line $x^{11} x^{11}$ of Fig. 3.

By reference to Fig. 8 it will be noted that the star wheel 14 is provided with four radial grooves 15, and between the outer extremities of said grooves is formed with four segmental notches or surfaces 14ᵃ. In the plane of this star wheel 14 the driving shaft 16 is provided with a wheel or disk 19 that carries an eccentrically located crank pin or roller 20 that is adapted, under rotation of the shaft 16, to successively engage the grooves 15 of the star wheel 14. The wheel 19 is cut away at 19ᵃ to afford clearance for and to permit intermittent movements of the star wheel 14. The main body portion of said wheel 19 engages with a segmental surface 14ᵃ of the star wheel 14 to lock the latter against rotation except when one of its grooves 15 is engaged by the crank pin 20. The device just described affords an extremely satisfactory means for imparting an intermittent step by step rotary movement to the rotary table 3 from the constantly running driving shaft 16, and the construction and arrangement must be such that this intermittent movement of the table 3 will aline the pockets 5 thereof, one after the other, directly over the parcel passage 8 of the non-rotary table 1.

Located directly below the parcel passage 8 in the fixed table 1, is a receding parcel support 21 that is mounted to slide vertically in an angular guide sleeve 22 that is secured to and depends from the top of the frame 2. The receding support 21 is connected, as shown, by a short link 23 to a lever 24 that is pivoted at 24ᵃ to one side portion of the framework 2 and is provided, at its intermediate portion, with a laterally projecting stud 25, preferably equipped with a roller. This roller-equipped stud 25 is subject to a cam 26 which is carried by the driving shaft 16, (see Figs. 3 and 4).

Vertically alined with and located immediately over the receding support 21 and the passage 8 of the fixed table 1, is a vertically movable parcel-depressing plunger which is preferably constructed as shown, being made up of upper and lower telescopic sections 27 and 28, the upper end of the former of which is rigidly secured to an arm 29 which in turn is rigidly secured to the upper end of a carrying bar 30 mounted to slide in a channeled guide 31 rigidly secured to the frame 2, (see particularly Figs. 3, 4, 6 and 10). A coiled spring 32 contained within the plunger section 28 and compressed between the two plunger members, yieldingly forces said section 28 downward. A nutted bolt 33 passed through the members 27—28 and the outer end of the arm 29 limits the downward movement of said member 28. Preferably the member 28 at its extreme lower end is provided with a pad 28ᵃ of rubber or other pliable material for direct action on the candy parcel, indicated by the character z in Figs. 3, 4 and 15.

Vertical movement is imparted to the carrying bar 30 and, hence, to the yielding parcel depressing plunger, from a cam 34, which is carried by the shaft 16. This cam 34 acts upon the roller-equipped stud 35 of a lever 36 that is pivoted to the frame 2 and is yieldingly drawn upward by a coiled spring 37, (see Fig. 10). The free end of the lever 36, in the arrangement illustrated, is connected, by a link 38, to one end of an intermediate lever 39 that is intermediately pivoted to the frame 2, and the other of which is connected, by a short link 39ᵃ, to said carrying bar 30.

Figure 4:
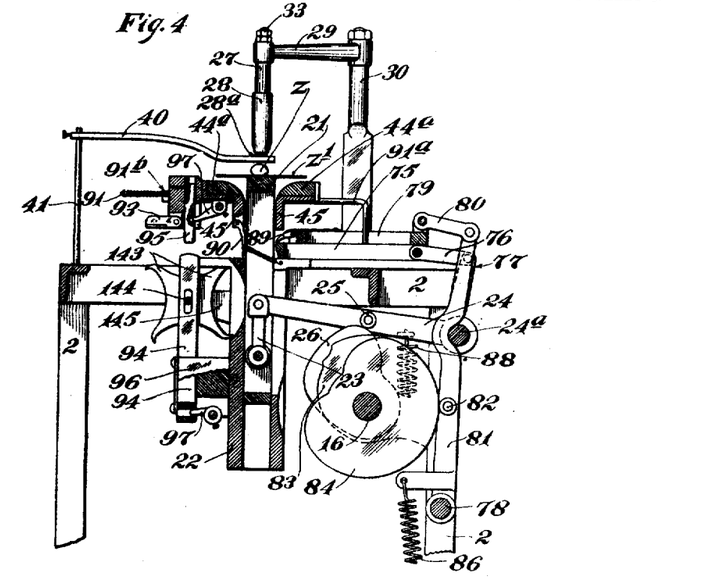
Fig. 4 is a vertical section taken from front to rear of the machine on the line $x^4 x^4$ of Fig. 3, some parts being broken away.

Normally the lower end of the plunger section 28 stands just above the pronged end of a guard arm 40, which, as shown, is rigidly secured, at its outer end, to the frame 2 by a small post 41 (see Figs. 1 and 4). This guard arm prevents the candy parcel z from jumping off from the receding support 21.

Figures 20, 21:
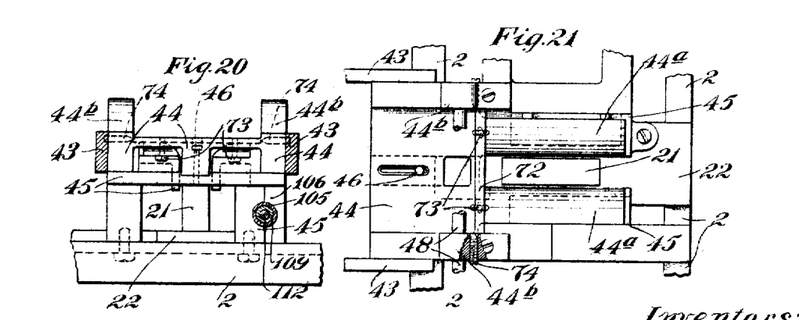
Fig. 20 is a detail view, partly in vertical section, showing the adjustable wrapper feeding and cutting device removed from the machine.
Fig. 21 is a plan view of the parts shown in Fig. 20.

The wrapping paper z¹ which is to be applied to the candy parcels is taken from a roll z², which, by means of a small spindle 42, is seated in the notched upper end of a pair of upwardly extended supporting arms 43, the lower ends of which are rigidly secured to an adjustable bearing block 44 (see Figs. 3, 20 and 21). This bearing block 44 is arranged to slide upon a bearing plate 45 that is rigidly secured to the frame 2 and has a suitable passage through which the upper end portion of the receding support 21 may freely pass. Furthermore, on opposite sides of said support 21 the block 44 is bifurcated and formed with beveled guide bars 44ᵃ the purpose of which will hereinafter appear. As shown, in Fig. 20, the adjustable block 44 is secured to the bearing plate 45 by a slot and screw connection 46.

A pair of coöperating paper feeding rollers 47, preferably rubber-faced, are secured to shafts 48. The lower shaft 48 is journaled in depending flanges of the adjustable bearing block 44, while the upper shaft 48 is journaled in eccentric bushings 49, which, in turn, are journaled in upwardly extended lugs 44ᵇ of the bearing block 44. The eccentric bushings 49 (see Fig. 2) are secured to the prongs of an adjusting lever 50 (see Fig. 1). By oscillations of the lever 50 the bushings 49 may be adjusted so as to move the upper roller 47 toward and from the lower roller, and so as to set the said rollers for action under any desired tension upon the paper wrapper z¹. Any suitable means may be provided for holding the lever 50 in different set positions, but in practice we have found that the bushings 49 may have such frictional engagement with their supporting bearings as to accomplish this result.

Figure 2:
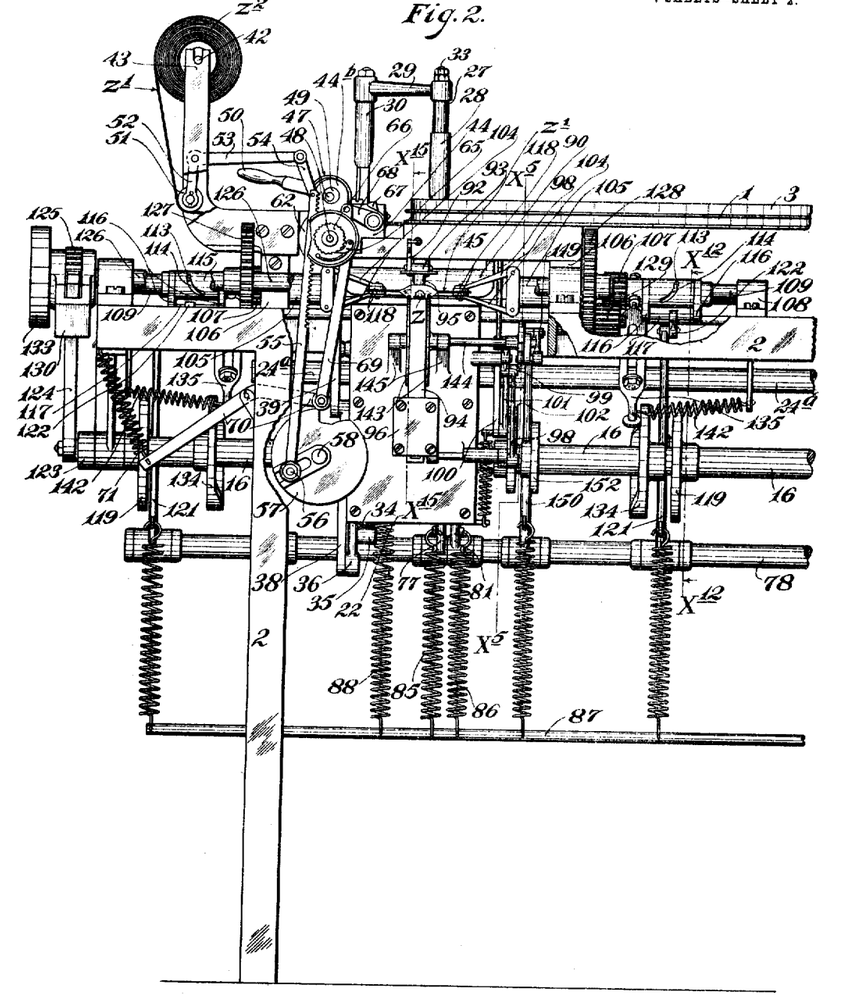
Fig. 2 is a front elevation of the machine, with some parts broken away.

For taking up the slack of the paper $z^1$ and to assist in unrolling the same, a roller 51 is journaled to the lower end of a pair of links 52, one of which has a long arm 53 (see Figs. 2 and 3.)

The free end of the arm 53 is connected by a short link 54 to the upper end of a long rack 55. At its lower end, the rack 55 is connected, by an adjustable crank pin 56, to a laterally offset slotted portion of the knife-actuating cam 57 carried by a short shaft (see Figs. 2 and 3). The shaft 58 is journaled in suitable bearings 59 on the frame 2 and at its inner end is provided with a miter gear 60 that meshes with a miter gear 61 carried by the shaft 16, as best shown in Fig. 3. The upper end portion of the rack 55 is guided by a suitable keeper 62 (see Figs. 1 and 2) that is pivoted on the lowermost feed roller shaft 48; and its teeth mesh with a pinion 63 on said shaft. The pinion 63 carries a flanged wheel 64 and both are loose on said shaft, so that they are capable of reverse oscillations under reciprocating movements imparted to the said rack by said crank. The wheel 64 carries a spring pressed dog 65 that engages the ratchet wheel 66 secured to the end of the shaft 48, as shown in Fig. 2.

Figure 7:
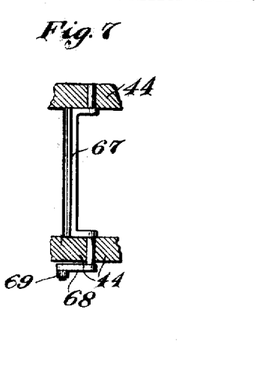
Fig. 7 is a detail view in plan, showing the wrapper cutting knife.

The knife which cuts the strip of wrapping paper $z^1$ is in the form of a bail (see Figs. 3 and 7). This knife 67 has trunnions mounted in suitable bearings in laterally spaced flanges of the adjustable guide blocks 44, and one of the said trunnions is provided with a short arm 68 (see Figs. 2 and 7) that is connected by a link 69 to the roller equipped end of a lever 70, which lever is intermediately pivoted to the frame 2, and the roller of which works upon the knife actuating cam 57. A spring 71 attached to the lever 70 and to the frame 2 keeps the roller of said lever pressed against said cam. The cutting edge of the knife 67 coöperates with a shearing bar 72 (see Figs. 3 and 21) that is adjustably secured to the side flanges of the adjustable block 44, as shown, by means of slot and screw connections 73 and pointed set screws 74. The said shearing blade 72 is adjustable so as to compensate for wear and to bring the same into proper position for coöperation with the knife.

Mounted to slide horizontally on the bed portion of the frame 2 (see Figs. 4 and 15), is a parcel transferring and positioning slide 75, the outer extremity of which is connected, by a short link 76, to the upper end of a lever 77 that is pivoted at its lower end on a rod 78 supported by the frame 2.

Mounted to slide on top of the slide 75 is a so-called "tucker slide" 79 that is connected, by a short link 80, to the upper end of a lever 81, which at its lower end is also pivoted on the rod 78. The levers 77 and 81 are provided with roller-equipped studs 82 subject, respectively, to cams 83 and 84 carried by the shaft 16, (see Figs. 3 and 4). The levers 77 and 81 are subject to springs 85 and 86 anchored at their lower ends to a rod 87 supported by the framework 2. The lever 24 already described is subject to a coiled spring 88 that is also anchored to the rod 87. By reference to Fig. 4 it will be noted that the levers 77 and 81 are bent to clear the rod $24^a$ to which the lever 24 is pivoted. At its inner edge the tucker slide 79 is provided with a pivoted tucker blade 89 (see Figs. 4 and 15) that coöperates with a pivoted spring-held folding blade 90 pivoted to a depending flange of the bearing plate 45.

Figure 5:
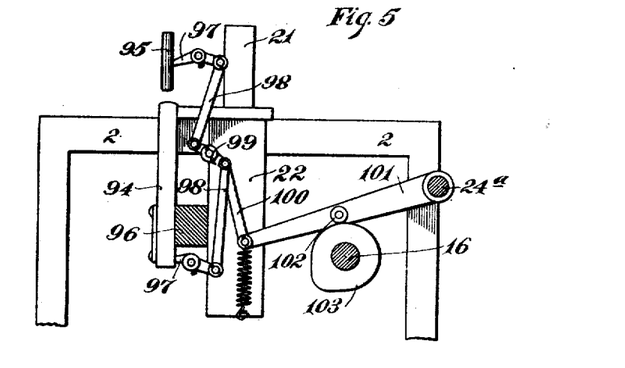
Fig. 5 is a skeleton view taken in section approximately on the line $x^5 x^5$ of Fig. 2, some parts being removed.
Figure 6:
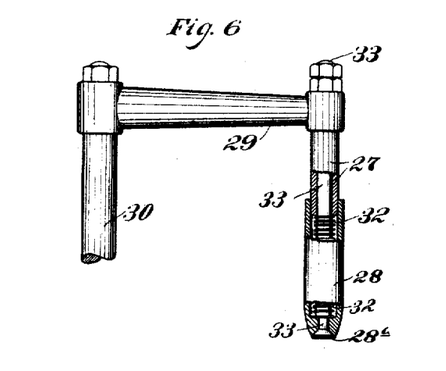
Fig. 6 is a detail partly in elevation and partly in vertical section, showing the so-called parcel depressing plunger.

A rack 91 (see Fig. 15) which is mounted to slide through the bearing plate 45 is subject to a stem $91^a$ that is rigidly secured to the slide 75, the slide 79 being cut away to afford clearance therefor. This rack is retracted by a spring $91^b$ and it meshes with a segmental gear 92 pivoted to depending lugs of the bearing plate 45 and rigidly connected to the positioning arm 93 that works in opposition to the slide 75 and coöperates therewith to centrally position the candy parcel $z$ directly over the upper end of the lower member 94 of a pair of vertically movable positioning plungers 94 and 95. The lower positioning plunger 94 (see Figs. 4 and 5) is mounted in a guide 96 on the sleeve 22, while the upper plunger 95 is mounted in the depending portion of the bearing plate 45. The two plungers 94 and 95 are subject to the ends of intermediately pivoted levers 97 that are connected, by links 98, to the opposite ends of an intermediately pivoted rocker 99, one arm of which is connected, by a link 100, to the free end of a downwardly spring-pressed lever 101, which lever 101 is pivoted on the rod $24^a$ and is provided with a roller-equipped stud 102 that works on a cam 103 carried by the driving shaft 16. As is evident, by the connections just described, movements of the lever 101, under the action of the cam 103, will impart simultaneous but reverse movements to the two positioning plungers 94—95.

Located on each side of the space occupied by the candy parcel wrapper when positioned by the plungers 94—95, slide 75 and blade 93, is a twisting device, each of which is preferably constructed as follows; (see Figs. 2 and 16 to 19 inclusive): A pair of twisting fingers 104 are pivotally connected to the bifurcated end of a sleeve 105 journaled in a bearing 106 on the frame 2 and provided, at its inner end, with a wide-faced spur pinion 107. Extended into the sleeve 105 and slidable in a bearing 108 on the frame 2, is a non-rotary sleeve 109 that is provided with an axially extended slot 110. At their pivoted ends the fingers 104 are provided with short inwardly projecting lugs 111 that work in the grooved end of an operating plunger 112 slidably mounted within the non-rotary sleeve 109 and provided with a radially projecting pin 113 that projects through the slot 110 of said sleeve; and also works in a spiral groove 114 of a collar 115, which latter is mounted to rotate upon the non-rotary sleeve 109, but is held against sliding movement in respect thereto. The collar 115 is provided with longitudinally spaced ears 116 that support a small rod 117, the axis of which is parallel to the common axes of the sleeves 105—109. At their free ends, the twisting fingers 104 are provided with pads or soft facings 118 that are adapted to engage the ends of the paper wrapper to twist the same around the candy parcel.

Figure 17:
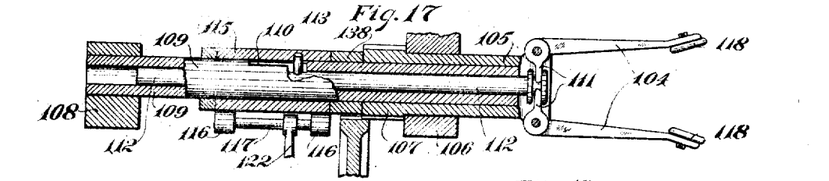
Fig. 17 is a view, partly in section and partly in plan, of the parts shown in Fig. 16, but with the twisting fingers opened up.
Figure 18:
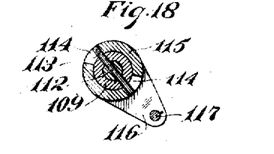
Fig. 18 is a section on the line $x^{18} x^{18}$ of Fig. 16.
Figure 19:
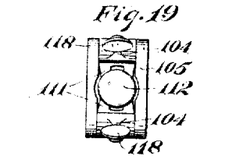
Fig. 19 is an end elevation of the parts shown in Fig. 17, looking in a direction from the right toward the left.

As is evident, when the collar 115 is oscillated, its spiral groove 114, operating on the pin 113, will cause said pin to travel in the groove 110 of the non-rotary sleeve 109, thereby imparting endwise movement to the rod or plunger 112; and this movement of said rod, in a direction from the right toward the left with respect to Fig. 17, will close the twisting fingers, while reverse movement of said plunger will, of course, open up the said fingers. The groove in the head of said plunger, of course, permits the twisting fingers to freely revolve around the non-rotary plunger 112.

Figures 12, 13, 14:
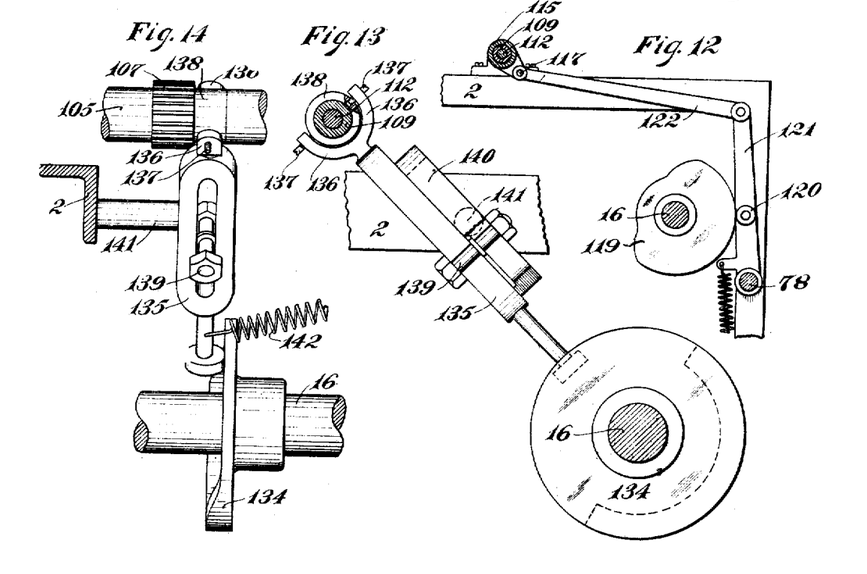
Fig. 12 is a fragmentary detail in section on the line $x^{12} x^{12}$ of Fig. 2, showing the cam and connections for effecting opening and closing movements of the fingers of the paper twisting device.
Fig. 13 is a fragmentary detail in section approximately on the line $x^{13} x^{13}$ of Fig. 3.
Fig. 14 is a front elevation of the parts shown in Fig. 13.

Oscillatory movement is imparted to the cam acting collar 115 from a cam 119 carried by the shaft 16 and operative on a roller-equipped stud 120 of a spring-pressed lever 121, the free end of which lever is connected, by a link 122, to the rod 117 of said collar 115 (see Fig. 12). The rod 117 is adapted to slide through the connected end of the link 122 and suitable stop devices (not shown) should be provided for holding the said link 122 against lateral movements.

The two twisters, in this improved machine, are given simultaneous intermittent rotary movements in opposite directions, so as to reversely twist the ends of the paper wrapper, and such motion is imparted, preferably by the following connections: At its left hand, as shown in Figs. 1, 2 and 3, the driving shaft 16 is provided with a crank 123, to which one end of a long rack 124 is pivoted. The teeth of this rack mesh with a pinion 125 that is loosely mounted on a counter-shaft 126, (see Figs. 1 and 2,) which shaft is journaled in suitable bearings on the frame 2 and is provided with a pair of laterally spaced spur gears 127—128, the former of which directly meshes with the wide-faced pinion 107 of the left hand twister, and the latter of which gears meshes with an intermediate wide-faced pinion 129, which, in turn, meshes with the wide-faced pinion 107 of the right hand twister. The intermediate gear 129, as is evident, will cause the right hand twister to rotate in a direction reverse to the direction of rotation of the left hand twister, and at the same time the wide-faced pinions will permit limited endwise sliding movements of the two twisters without throwing the said gears out of mesh.

The free end of the rack 124 slides through a yoke-like guide 130 that is suspended on the shaft 126 (see particularly Fig. 1). At its extreme left hand end in respect to Figs. 1 and 2, the countershaft 126 carries a ratchet wheel 131 that is engaged by a driving dog 132, carried by a wheel 133, the hub of which wheel is connected through one side of the guide 130 to the hub of the loose pinion 125. Through this connection, it is evident, intermittent rotation will be imparted to the countershaft 126 under continuous rotation of the driving shaft 16 and crank 123. This is accomplished by a pair of cams 134 carried by the driving shaft 16 (see Figs. 2, 3, 13 and 14). These cams act on the roller-equipped ends of levers 135, which levers, at their other ends, are formed with forks 136 that are connected by set screws 137 to coöperating collars 138 secured one on each of the non-rotary slidable sleeves 109 (see particularly Figs. 13, 14 and 17). The levers 135 are intermediately pivoted on fulcrum studs 139 (see Figs. 13 and 14) that are adjustably but rigidly secured in slots of elongated heads 140, which, as best shown in Figs. 13 and 14, are rigidly secured to the outer ends of studs 141 rigidly secured to one of the upper bars of the frame 2. The roller-equipped ends of the levers 135 are held against the respective cams 134 by springs 142 suitably anchored to the main frame, as best shown in Figs. 2, 3 and 14. Said cams 134 act in opposite directions to simultaneously impart reverse axial movements to the reversely driven twisters. The adjustable fulcrums 139 permit the said levers to be set to impart exactly the desired or required endwise approaching travel to the twisters.

The wrapped candy parcels are ejected or discharged off from the upper end of the positioning slide 94 by means of a sort of a star wheel 143; or, as preferably constructed, two such star wheels arranged to work one on each side of said slide 94. These star wheels 143 are secured on a small shaft 144 mounted in bearings 145 on the box-like sleeve 22. The plunger 94 has a slot (see Fig. 4) through which the shaft 144 works. At its projecting end the shaft 144 is provided with a ratchet wheel 146 having as many teeth as the star wheels have arms. This ratchet wheel is intermittently driven by a spring-pressed dog 147 carried by an arm 148 pivoted on the shaft 144. The arm 148 is connected by a link 149 to the upper end of a spring-pressed lever 150 that is provided with a roller-equipped stud 151 subject to a cam 152 carried by the driving shaft 16.

Figure 15:
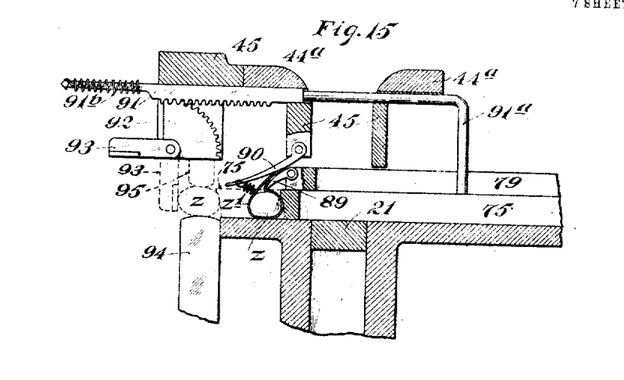
Fig. 15 is a fragmentary view in vertical section, taken approximately on the line $x^{15} x^{15}$ of Fig. 2.
Figure 16:
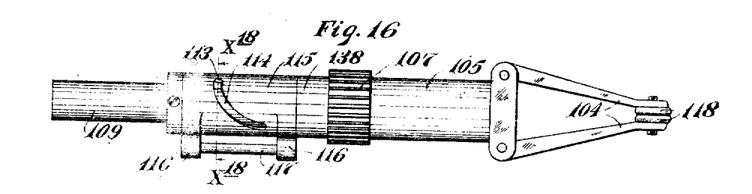
Fig. 16 is a detail view in plan, showing one of the wrapper twisters.

Operation: The operation of the machine, summarized, is substantially as follows: The pieces of candy or parcels thereof are preferably placed in the pockets 5 of the rotary feed table 3 by hand and, as already indicated, they will be delivered, one after the other onto the receding parcel support 21. In the normal position of the machine, or what is assumed for illustration to be the normal position of the machine, the paper strip or wrapper $z^1$ is assumed to be properly positioned under the feed passage 8 of the non-rotary feed table 1 and over the upper surface of the parcel support 21. Starting with the operation of the machine from this point, the initial movement of the driving shaft 16 and its various cams will cause the knife 67 to move downward and sever or cut off a paper section sufficient to form the wrapper for the positioned candy parcel; and approximately simultaneously with this movement of the knife the intermittent movement is imparted to the rotary feed table 3 required to position a candy parcel directly upon the central portion of this cut paper section and, of course, onto the receding support 21. Immediately following these noted actions, the parcel depressing plunger 27—28 commences its downward movement; and approximately at the time its yielding section is engaged with the said parcel the downward movement of the support 21 is begun, so that the said plunger and receding support continue their downward movements together with the candy parcel held thereby against displacement. Immediately after the support 21 reaches the limit of its downward movement, shown in Fig. 15, the plunger 27—28 is returned upward to normal position, but the support 21 is held downward while the transfer slide 75 and the tucker slide 79 are moved over the same and back again to normal position, after which the said support 21 is returned to normal position. The movement of the slide 79 from the right toward the left with respect to Figs. 4 and 15 is more rapid than that of the slide 75 up to the time the said slide 79 reaches the extreme position shown in Fig. 15, but the said slide 75 continues its movement until it reaches the position shown by dotted lines in Fig. 15. The movements of the said slides 75 and 79 to the position shown in Fig. 15 forces the parcel $z$ and wrapper $z^1$ off from the support 21 and causes the tucker blade 89 to force one edge of the wrapper under the other of the said wrapper, which latter edge is pressed backward and folded over the under edge or tucked-in edge of the wrapper by the yielding folding blade 90, all as clearly shown in Fig. 15. Furthermore, the yielding blade 90 holds down the folded edges of the wrapper, while the covered candy parcel is being delivered by the slide 75 onto the upper end of the positioning plunger 94. The slide 75, the positioning or alining blade 93, and the positioning plungers 94 and 95 will reach their extreme positions on the parcel indicated by dotted lines in Fig. 15 at the same time, so that by these four elements the candy parcel with the paper wrapper folded around the same will be positioned with the ends of the wrapper located between the open fingers or jaws 104 of the two twisters. As soon as this is done, the fingers or jaws of the twisters are closed onto the ends of the wrapper, the twisters are rotated to twist the ends of the wrapper, in reverse directions, and the said twisters are given their endwise movement toward the parcel, so as to prevent tearing of the wrapper, as the wrapper is shortened by the twisting action. The candy parcel and wrapper will be held by the four noted elements 75, 93, 94 and 95, while the ends of the wrapper are being twisted in reverse directions; and these elements, as well as the slide 79, will return to normal positions immediately after the twisting of the wrapper has been completed. Also, as soon as the twisting of the wrapper is completed, the fingers or jaws of the twisters open up and the twisters are moved axially back to normal position with the said fingers or jaws positioned for action on the next wrapper. Approximately simultaneous with the return of the twisters to normal position, the star wheels or ejectors 143 are given a one-fourth rotation which serves to kick or force the wrapped or completed parcel off from the upper end of the plunger 94. The completed candy parcel thus discharged, may be caught in any suitable receptacle, or may be dropped upon the floor.

As already indicated, the upward return movement of the support 21 takes place immediately after the slides 75—79 have been returned to normal positions. This return or upward movement of said support 21 may be approximately simultaneous with the movement of the feed rollers 47 required to position the next section of the wrapper $z^1$ over the upper surface of said support 21.

While the feed rollers are in action on the paper strip or web, the slack take-up roller 51, by the arms 52 and 53, is moved in a direction away from the web and while the said feed rollers are idle it is moved in a direction toward the web, so that the combined action of the feed rollers and of the said slack take-up roller is to always keep the roll of paper under motion and thereby eliminate such strains that will be put upon the paper by sudden starting and stopping of the drawing or feeding action on the paper roll.

As already indicated, the amount of paper that will be fed under each operation of the feed rollers may be varied as required for parcels of different size, by adjustments of the crank pin 56 in the groove of the wheel 57. The knife 67, that is, the cutting edge thereof, should be located from the vertical axis of the positioned parcel $z$ on the support 21 a distance equal to one-half the length of the wrapper section which is fed onto the support 21 by the feed rollers. This is what makes desirable the above described adjustable support or supporting block for the said knife, and preferably also for the feed rollers.

The drawings of this application were made from a working machine which has been put into actual use and found highly efficient for the purposes had in view.

What we claim is:

1. In a machine of the kind described, the combination with means for holding the parcels and wrappers, of a rotary twister, and means for moving said rotary twister toward the parcel after it has engaged the wrapper, said means involving an adjustable device for varying the amount of axial movement which will be given to said twister in a direction toward and from the parcel.

2. In a machine of the kind described, the combination with a receding parcel support and an overlying parcel depressing plunger, of means for moving the parcel and wrapper laterally from said receding support, when the latter is depressed, coöperating positioning devices for holding the parcel and wrapper thus removed from said support in a stationary position at one side of said receding support, and means for twisting the ends of the wrapper while the said parcel is thus held in a stationary position.

3. In a machine of the kind described, the combination with a receding parcel support and an overlying parcel depressing plunger, of a reciprocating slide for moving the parcel and wrapper from said receding support, when the latter is depressed, devices coöperating with said slide to tuck the wrapper around the parcel while it is being moved by said slide, means for holding said parcel and wrapper in a stationary position at one side of said receding support, and means for twisting the ends of the wrapper while the said parcel is thus held in a stationary position at one side of said receding support.

4. In a machine of the kind described, the combination with two pairs of reversely movable parcel and wrapper positioning devices arranged to move on intersecting lines, of means for simultaneously moving the said parcel positioning device toward and into engagement with the parcel and wrapper, and means for twisting the ends of the wrapper while held by said parcel positioning device.

5. In a machine of the kind described, the combination with reversely-movable horizontal and reversely-movable vertical parcel and wrapper positioning devices, of means for simultaneously moving the said positioning devices toward and into engagement with said parcel and wrapper, and means for twisting the ends of the wrapper while held by said positioning devices.

6. In a machine of the kind described, the combination with a receding parcel support and an overlying vertically movable yielding parcel depressing plunger, of a transfer slide operative to remove the parcel and wrapper from said receding support when the latter is depressed, parcel positioning devices coöperating with the transfer slide to hold the parcel and wrapper at one side of said parcel support, and twisters operative on the ends of said wrapper to twist the same.

7. In a machine of the kind described, the combination with a receding parcel support and a rotary feed table arranged to deliver the parcels and wrappers onto the same, of a vertically movable parcel depressing plunger overlying said receding support and having downward movement approximately simultaneous therewith, a parcel transfer slide arranged to move the parcel and wrapper off from said support when the latter is depressed, means for tucking the wrapper around said parcel while they are being thus transferred, and means for twisting the ends of the wrapper around the transferred parcel.

8. The combination with reversely-acting parcel and wrapper positioning elements and means for simultaneously moving the same toward and into engagement with said parcel and wrapper, of twisters operative to twist the ends of said wrapper while held by said positioning elements, and an intermittently-acting arm-equipped parcel ejecting wheel operative to discharge the wrapped parcel.

9. In a machine of the kind described, the combination with a parcel transfer slide and coöperating parcel positioning devices, of means for tucking the wrapper around said parcel while it is being moved by said transfer slide, comprising a yielding folding blade under which the parcel and wrapper are passed, and a second slide having a tucking blade arranged to work under said folding blade, the said latter slide having movement approximately coincident with but of less extent than said transfer slide.

10. In a machine of the kind described, the combination with a receding parcel support and an overlying parcel depressing plunger having downward movement approximately coincident therewith, of a parcel transfer slide operative to transfer the parcel and wrapper from said receding support while the latter is depressed, devices coöperating with said transfer slide to position and hold the transferred parcel and wrapper, and means for tucking the wrapper around said parcel while it is being moved by said transfer slide, said means comprising a yielding folding blade under which the parcel and wrapper are passed, and a second slide having a tucking blade, the said latter slide having a movement approximately simultaneous with but of less extent than the said transfer slide.

11. In a machine of the kind described, the combination with means for holding the parcel and wrapper, of a pair of jaw-equipped twisters for gripping the ends of the wrapper, means for rotating said twisters, and means for moving said twisters toward the parcel after they have gripped the ends of the wrapper, the said latter noted means being adjustable to vary the extent of endwise travel of said twisters.

12. In a machine of the kind described, the combination with means for holding the parcels and wrappers, of a pair of jaw-equipped twisters for gripping the ends of the wrapper, means for simultaneously rotating said twisters, and means for moving said twisters toward the parcel after they have gripped the ends of the wrapper, the said latter means comprising a lever having an adjustable fulcrum whereby the extent of endwise movement of the twisters may be varied.

In testimony whereof we affix our signatures in presence of two witnesses.

MAXIMILIAN E. BUHSE.
WALTER W. BUHSE.
HENRY L. BUHSE.
ALEXANDER F. BUHSE.

Witnesses:
HARRY D. KILGORE,
F. D. MERCHANT.